US012338188B2

(12) United States Patent
Patki et al.

(10) Patent No.: US 12,338,188 B2
(45) Date of Patent: Jun. 24, 2025

(54) METHOD FOR MANUFACTURING A DECORATIVE ELEMENT COMPRISING AN ENGINEERED STONE AND A DECORATIVE ELEMENT COMPRISING AN ENGINEERED STONE

(71) Applicant: Dal-Tile, LLC, Dallas, TX (US)

(72) Inventors: Rahul Patki, Dallas, TX (US); Eladio Pinero Gonzalez, Dallas, TX (US); Claudio Caselli, Dallas, TX (US)

(73) Assignee: Dal-Tile, LLC, Dallas, TX (US)

( * ) Notice: Subject to any disclaimer, the term of this patent is extended or adjusted under 35 U.S.C. 154(b) by 296 days.

(21) Appl. No.: 17/983,036

(22) Filed: Nov. 8, 2022

(65) Prior Publication Data

US 2024/0002304 A1    Jan. 4, 2024

Related U.S. Application Data

(60) Provisional application No. 63/357,264, filed on Jun. 30, 2022.

(51) Int. Cl.
*C04B 41/71* (2006.01)
*B05D 7/00* (2006.01)
(Continued)

(52) U.S. Cl.
CPC ............... *C04B 41/71* (2013.01); *B05D 7/57* (2013.01); *B41M 5/0047* (2013.01); *C04B 26/18* (2013.01);
(Continued)

(58) Field of Classification Search
CPC . C04B 41/52; C04B 41/4572; C04B 41/4574; C04B 2103/54; C04B 2103/605; C04B 41/483; C04B 41/53
See application file for complete search history.

(56) References Cited

U.S. PATENT DOCUMENTS 2,005,027 A    6/1935    Ellsworth
2,140,197 A    12/1938    Batcheller
(Continued)

FOREIGN PATENT DOCUMENTS

CZ             308786 B6      5/2021
DE     102018005876 A1 *    1/2020    ............. B32B 15/08
(Continued)

OTHER PUBLICATIONS

Tunte DE102018005876A1 English Translation 2020 (Year: 2020).*
(Continued)

*Primary Examiner* — Jacob T Minskey
*Assistant Examiner* — Adrien J Bernard
(74) *Attorney, Agent, or Firm* — Ryan D. Jenlink; Conley Rose, P.C.

(57) ABSTRACT

A method for manufacturing a decorative element comprising a substrate and a top layer wherein the substrate is made of an engineered stone and wherein the top layer comprises a decorative pattern, comprising the steps of: providing a mixture comprising at least an inorganic filler and a binder; compacting the mixture; and curing the binder to obtain the substrate; wherein the method comprises the step of inkjet printing a first decorative pattern on at least a top surface of the substrate, and wherein the method comprises the step of providing a protective coating above the printed pattern, wherein the protective coating comprises a base coat that is applied immediately on top of the printed pattern and a top-coat that is provided above the base coat, between the application of the base-coat and the application of the top coat the method comprises the step of sanding the base coat.

19 Claims, 2 Drawing Sheets

(51) Int. Cl.
  *B41M 5/00* (2006.01)
  *C04B 26/18* (2006.01)
  *C04B 41/00* (2006.01)
  *C04B 41/45* (2006.01)
  *C04B 41/49* (2006.01)
  *C04B 41/63* (2006.01)
  *C04B 103/54* (2006.01)

(52) U.S. Cl.
  CPC ........ *C04B 41/009* (2013.01); *C04B 41/4543* (2013.01); *C04B 41/4922* (2013.01); *C04B 41/63* (2013.01); *C04B 2103/54* (2013.01)

(56) References Cited

U.S. PATENT DOCUMENTS

| | | | |
|---|---|---|---|
| 4,040,896 | A | 8/1977 | Harrington et al. |
| 6,025,023 | A | 2/2000 | Valente et al. |
| 7,108,890 | B2 | 9/2006 | Home et al. |
| 2002/0064616 | A1 | 5/2002 | Sawatsky |
| 2005/0271802 | A1 | 12/2005 | Satoh |
| 2006/0201349 | A1 | 12/2006 | Roberts et al. |
| 2008/0160254 | A1 | 7/2008 | Arnold |
| 2010/0231671 | A1 | 9/2010 | Anton et al. |
| 2011/0250404 | A1 | 10/2011 | Pervan et al. |
| 2014/0023832 | A1 | 1/2014 | Pervan et al. |
| 2014/0231403 | A1 | 8/2014 | Stopperan |
| 2015/0251472 | A1 | 9/2015 | Yeh |
| 2015/0344471 | A1 | 12/2015 | Chatterjee et al. |
| 2015/0344712 | A1 | 12/2015 | Harrison |
| 2015/0345141 | A1 | 12/2015 | Caselli et al. |
| 2016/0229177 | A1 | 8/2016 | Yamamoto et al. |
| 2016/0271971 | A1 | 9/2016 | Wang et al. |
| 2016/0319554 | A1 | 11/2016 | Thiers et al. |
| 2018/0186176 | A1* | 7/2018 | Bastin ............ B44C 5/04 |
| 2019/0009430 | A1 | 1/2019 | Scardovi et al. |
| 2019/0099780 | A1* | 4/2019 | Caillier ............ B41M 5/0047 |
| 2019/0099915 | A1 | 4/2019 | Adams et al. |
| 2019/0225849 | A1 | 7/2019 | Bollstrom et al. |

FOREIGN PATENT DOCUMENTS

| | | |
|---|---|---|
| GB | 376284 A | 4/1932 |
| JP | 2011093306 A | 5/2011 |
| KR | 200416510 Y1 | 5/2006 |
| KR | 1007505119 B1 | 8/2007 |
| WO | 2007138529 A2 | 12/2007 |
| WO | 2009010406 A2 | 1/2009 |
| WO | 2016102000 A1 | 6/2016 |
| WO | 2016113652 A1 | 7/2016 |
| WO | 2019070621 A2 | 4/2019 |

OTHER PUBLICATIONS

U.S. Appl. No. 63/357,264, entitled "Method for Manufacturing a Decorative Element Comprising an Engineered Stone and a Decorative Element Comprising an Engineered Stone", filed Jun. 30, 2022, 36 pages.

Tile Outlets of America, Florida LLC. "How Inkjet Technology has transformed ceramic and porcelain tile", Sep. 15, 2016, accessed Mar. 7, 2023, 9 pages.

U.S. Appl. No. 18/184,079, entitled "Method for Manufacturing a Decorative Element Comprising an Engineered Stone and a Decorative Element Comprising an Engineered Stone", filed Mar. 15, 2023, 38 pages.

* cited by examiner

METHOD FOR MANUFACTURING A DECORATIVE ELEMENT COMPRISING AN ENGINEERED STONE AND A DECORATIVE ELEMENT COMPRISING AN ENGINEERED STONE

CROSS-REFERENCE TO RELATED APPLICATIONS

This application claims priority to U.S. Provisional Application No. 63/357,264, entitled "Method for manufacturing a decorative element comprising an engineered stone and a decorative element comprising an engineered stone," filed on Jun. 30, 2022, the disclosure of each of which is herein incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD

The invention relates to a method for manufacturing a decorative element comprising an engineered stone and a decorative element comprising an engineered stone. The decorative element of the invention is of the type comprising a substrate and a top layer, wherein the substrate is made of an engineered stone and wherein the top layer comprises a decorative pattern. In particular, the engineered stone of the invention is often known on the market as quartz.

BACKGROUND

An engineered stone comprises an inorganic filler like crushed stones, sands or other minerals but also recycled ceramic or glass, bonded by means of a cured resin. More in detail, with engineered stone is intended a composite material formed by an inorganic filler or a stone like material bonded together by means of a cured binder that it is cured at low temperature, wherein with low temperature is intended a temperature below 500° C. The binder is preferably a thermosetting resin.

Traditionally, natural stone is used as building material, especially for finishing the buildings like for example for coverings of wall or floor and for producing worktops like kitchen or bathroom countertops and vanities. Natural stones are extracted from mines and subsequently cut and polished to obtain slabs or boards of the desired shape. Due to the mine extraction, natural stones are relatively expensive and produce a high impact on the environment.

SUMMARY

Therefore, in the past years methods for manufacturing engineered stones were developed in order to reduce costs and provide a more environment friendly product. A well-known example of such methods is represented by the so called Bretonstone® technology described, for example, in the document, WO 2007/138529. Said document discloses a method for manufacturing an engineered stone which comprises the step of: providing a mineral filler, for example by grinding sand or quartz; mixing the stone or stone like material with a binder, for example a resin powder, in order to obtain a mixture; depositing the mixture in a mold of a press, having shape and dimension similar to those of the final article; press the mixture applying vacuum, with the accompanying application of a vibratory motion at pre-established frequency; the semi-product obtained is then hardened by means of a heat curing process to obtain the engineered stone; the engineered stone is then subjected to finishing steps like cutting or polishing.

Such kind of engineered stone normally comprises a one-color decoration. Alternatively, the engineered stones comprise a décor comprising artificial veins for imitating a natural stone like marble or granite. As disclosed in WO 2009/010406 such décor is obtained by adding a coloring agent to the mixture before the mixture is deposited in the mold. The mixture is carried by an endless belt above the mold and is loaded into the mold itself by free falling from the end of the belt. The coloring agent is loaded by means of appropriate nozzles to the surface of the mixture substantially in correspondence of the end of the belt so to fall into the mold together with the mixture in a non-controlled manner. Following the vibro-compression step the pigment particles distribute in the mixture thereby generating a veined effect through the entire thickness of the engineered stone. Therefore, with this technique it is not possible to obtain an engineered stone with a reproducible and pre-defined décor.

WO 2016/113652 discloses an equipment and a method for creating programmable chromatic effect in an engineered stone by means of a computer-controlled machine. The machine is an anthropomorphous robot or a cartesian robot provided with one or more nozzles for dispensing a coloring agent on the surface of a mixture in a temporary support. The nozzle is connected to a tool that interacts with the surface of the mixture to create grooves or holes to receive the color in order to imitate marble veins. Thus, this equipment needs a machine work of the mixture and provides for décor imitating natural stone with a relative low-quality resolution. This technology is slow and has limits in the dimension of the imitated veins that can be imitated. Moreover, it is noted that the created pattern is subjected to vibration and compaction so that the final pattern always differs from the starting predetermined pattern.

WO2019070621 discloses a method for improving the aesthetic quality of the engineered stone by inkjet printing a décor on a main surface of the stone.

The present invention aims in the first place at providing an alternative and improved method for manufacturing an engineered stone, which, in accordance with several of its preferred embodiments, is directed to solve one or more of the problems arising in the state of the art.

DETAILED DESCRIPTION OF THE EMBODIMENTS

Thereto, the present invention, according to its first independent aspect, relates to a method for manufacturing a decorative element comprising a substrate and a top layer wherein the substrate is made of an engineered stone and wherein the top layer comprises a decorative pattern, comprising the steps of:
  providing a mixture comprising at least an inorganic filler and a binder;
  compacting the mixture;

curing the binder to obtain the substrate; and wherein the method comprises the step of inkjet printing a first decorative pattern on at least a top surface of the substrate.

The engineered stone can be manufactured in any desired form although substantially flat shapes like a board, a tile or a slab are preferred. The engineered stone is preferably shaped as a slab wherein with slab is intended a substantial rectangular and flat form, preferably comprising a surface of minimum 1.5 square meters. In this way, the engineered stone is manufactured in a shape that is sufficiently large to be versatile and adapted to be cut according to the dimension and shape of the final destination of the engineered stone itself, like for example a kitchen or bathroom countertops. According to a preferred embodiment, the slab has a length of at least 2 m, preferably at least 2.5 m, for example 3 m or more, and a width of at least 1 m preferably 1.5 m or more. Moreover, the slab preferably shows a thickness of at least 10 mm, preferably at least 20 mm for example 30 mm.

In the preferred embodiment the inorganic filler comprises mineral material like any kind of stone, sands, siliceous mineral material, for example quartz, silica sand, clay, feldspar cristobalite granite, talc or calcareous mineral material, for example, calcium carbonate, marble, gypsum. The inorganic filler can also comprise ceramic, glass, metals and other inorganic material, for example recycled materials. The filler can be in form of powder, granules, shards, grains, aggregates or any other particulate form although granules and powder forms are preferred. Preferably the filler is in powder form having an average particle dimension lower than 45 μm, preferably lower than 20 μm. The filler is preferably at least the 80% by weight of the mixture, preferably more than the 85% and more preferably more than 90%. According to another embodiment of the invention the filler can be in form of aggregates, grains and/or granules having a particles size distribution between 0.1 and 6.5 mm, preferably between 0.1 and 2 mm, 0.1 and 0.7 mm. In the most preferred embodiment, the filler is composed by a combination of powder and grains, for example said combination can comprise at least 60 wt % of grains and/or granules and between 20 to 35 wt % of powder form wherein, for example, the granules have a particles size distribution between 0.1 and 6.5 mm and the powder have an average particle dimension lower than 45 μm, preferably lower than 20 μm. In the most preferred embodiment of the invention the filler is composed for its majority, i.e. at least 50% weight, and more preferably mainly consist, of an inorganic material that is based on silicon (Si). Silicon based material like siliceous minerals and glass show a good affinity with the binder so that the final bonding can be improved.

In some embodiments, crystalline silica, feldspar or kaolin can constitute preferred choice for the inorganic filler, or at least for a majority of the filler, as they can show a relatively white color. In some embodiments, glassy and/or amorphous inorganic fillers can be preferred for forming the majority of the inorganic filler as they can reduce the amount of free crystalline silica dust in manufacturing and/or working of the decorative element.

The binder is a curable substance that is configured to be cured thereby bonding together the particles of the stone or stone like material. The binder can be in any form, i.e. liquid, solid, gel or any form that is suitable to be mixed with the filler and to be homogeneously dispersed within. In some embodiments, powder form can be preferred as reduce the possibility of contamination of the mixture from other substance, that can occur using wet form of binders. The binder can be an organic substance, for example a resin. In the most preferred example the binder can be a thermosetting resin.

In the most preferred embodiment the binder comprises, preferably substantially consists of, polyester resin preferably unsaturated polyester resin. Less preferred alternative solutions for the binder comprise acrylic resin, epoxy resin, polyurethane, rubber, vinyl ester resin or the like. The binder is preferably less than the 20% by weight of the mixture, preferably less than the 15% and more preferably less than 10%. Polyester resins have shown a very high coupling capability with the inorganic filler.

It is noted that the mixture can also comprise additives, like for example coupling agents, catalyst or reagents to activate or speed up hardening of the binder, and/or temporary bonding agent like glues or thermoplastic resins that temporarily bonds the stone or stone like material. In the most preferred example, the additives comprise at least a silane-based coupling agent to further enhance the bonding between silicon-based filler and the binder, preferably the unsaturated polyester binder. Moreover, the additive can comprise crosslinkers and/or catalysts to activate and/or accelerate curing of the binder.

In the preferred embodiment the mixture can further comprise one or more coloring agents. Said coloring agent can be in the form of dye or pigment. Pigments are normally preferred as they provide a better UV resistance to the final engineered stone. Pigments can be organic or inorganic, the latter are even more preferred as the UV resistance is further improved. Preferred colors for the coloring agent are black, yellow, white, red and green.

The mixture can be provided in different forms, for example in form of a pasty material or a slip, although a dry form, for example incoherent particulate, is preferred. According to a preferred embodiment wherein the mixture is provided in form of an incoherent material, the mixture comprises a first particulate filler and a second particulate of binder mixed together, preferably in powder form. Alternatively, the incoherent particulate can be formed by granulates or pellets wherein each granule comprises the filler and the binder bonded together for forming the granule.

In the preferred example the mixture can be provided directly into a mold, a frame or any other tool suitable for providing a shape to the mixture by means of hopper or feeder.

Before and/or during the step of providing the mixture into the mold a first coloring agent or a first set of coloring agent can be added to the mixture. The first coloring agent, or first set of coloring agent, can be uniformly distributed in the substrate to provide basic color of the engineered stone. In some embodiments, the first coloring agent, or first set of coloring agent, can be distributed according to a random motif, like a random veined effect or a dotted effect.

During and/or after the step of providing the mixture into the mold a second coloring agent or second set of coloring agent can be to the mixture in the mold according to a motif which can be random or predetermined. Preferably, the second coloring agent or second set of coloring agent can be provided according to a predetermined motif e.g. a veined effect imitating the veins or flakes of a marble, a granite or any natural stone. In a preferred embodiment the predetermined pattern can be formed using computer-controlled machines, like for example an anthropomorphous robot or a cartesian robot, provided with one or more nozzles for dispensing the coloring agent. The nozzle is connected to a tool that interacts with the surface of the mixture to create grooves or holes to receive the coloring agent. Preferably said predetermined motif is obtained using computer-controlled machines like those described in WO 2016/113652.

The random motif formed by the first coloring agent, or first set of coloring agents, or the predetermined motif formed by the second coloring agent, or second set of coloring agents, or preferably a combination thereof form a second decorative pattern of the decorative element. Said second decorative pattern is present in the substrate and in particular is present through the entire thickness of the substrate. In practice said second decorative pattern forms a three-dimensional décor.

The mold can have the shape and dimension similar to those of the final product to be obtained or to those of a semi product of the process. Preferably the mold or frame has the shape and dimension similar to those of a slab or panel. In the preferred embodiment the mold is made of rubber and comprises a concave body adapted to receive the mixture and a lid adapted to close the concave body so that the mixture is completely closed into the mold. It is noted that in less preferred embodiment the mixture can just be disposed onto a belt or in an open mold or frame.

Preferably the compacting step is conducted under vacuum, i.e. vacuum is generated in the mold to help extracting air between the mixture particles. More preferably, vibration is applied to the mold or frame during the compacting step thereby helping to compact of the mixture particles, so that the porosity of the engineered stone is significantly reduced. According to a preferred embodiment both vacuum and vibration are applied to the mixture during the compression. In this way, it is possible to obtain a very high degree of compaction of the mixture that after curing will lead to a extremely low porosity.

It is to be noted that as a consequence of the compacting step the powders and grains forming the mixture in the mold can be subjected to a displacement that modifies the motif of the first and/or second coloring agent. Therefore, the final second decorative pattern of the decorative element differs from the motifs originally provided into the mold and every decorative element is unique and differs from the other. In particular, said vibration can cause the displacement of the particulate so that, there can be mixing of colors and/or mixing of colored and non-colored mixture. For example, in case this displacement occurs at the edges of the veins forming said second decorative pattern, it can result in a shading at the edges themselves so that the contour of said veins results less definite.

After the compacting step, the mixture in the mold is carried to a curing station. The cure of the binder can be obtained by means of radiation, heat, chemical curing or other suitable techniques. In the preferred embodiment, the curing step is conducted at a temperature below 500° C., for example below 200° C., for example at room temperature. In particular, in the preferred example the curing step can be thermally activated and continues in an exothermic reaction. The activation of the curing of the binder can occur at a temperature below 100° C.

After curing the engineered stone comprises a porosity below 1% in volume, more preferably below 0.5% in volume, even more preferably below 0.2%, in volume.

After curing, the engineered stone is extracted from the mold. In some, embodiments the engineered stone is cooled and/or conditioned before performing further steps.

After curing the method can comprise a calibration step and/or a squaring step. Calibration and squaring are mechanical machining steps that have the scope of providing to the engineered stone the final desired shape and dimension. In particular, calibration has the scope of flattening one or both the main surfaces of the substrate made of engineered stone.

The method may further comprise mechanical surface treatment of at least to the upper surface of the substrate to provide the latter with the desired texture. Said mechanical surface treatment can be a polishing, lapping or sanding step. In the preferred embodiment, said a t polishing step is conducted using abrasive having a Coated Abrasives Manufacturers' Institute (CAMI) Grit designation between 300 and 600 grits, preferably 400 grits. The inventors have found that a said polishing step, conducted in this manner can provide an improved bonding between the substrate and the top layer of the decorative element. In fact, the obtained texture is sufficiently rough to provide an increase of specific surface, thereby overcoming the lack of adhesion caused by the low porosity of the substrate. Moreover, the rugosity obtained in this polishing step using these kind of abrasion have be found ideal to optimize the scratch resistance and the glossiness of the final product. It is noted that mechanical surface treatment is preferred above chemical surface treatment like etching as the latter is less controllable and could damage the engineered stone and/or the second decorative pattern.

After said mechanical surface treatment, the method may comprise the step of applying an adhesion promoter coating on the upper surface of the substrate. Said adhesion promoter coating may improve the adhesion of the top layer to the substrate in order to finally improve the scratch resistance of the decorative element. In the most preferred embodiment, the adhesion promoter coating can comprise a silane-based substance. The adhesion promoter coating can be applied in a quantity between 20 and 60 g/sqm, preferably 40 g/sqm. Said adhesion promoter coating can be applied using various techniques, amongst which roller coating is preferred. The adhesion promoter coating is preferably transparent or translucent so that the second decorative coating is visible through it. In the most preferred embodiment, the adhesion promoter coating is a water-based substance, and the method further comprises the step of drying the adhesion promoter coating. In some embodiment the adhesion promoter coating can comprise a dry to water content between 1:6 and 1:3, for example 1:4. Preferably the above-mentioned application quantity of the adhesion promoter is a wet quantity, for example considering the water content of the coating before the drying step. Said drying step can be performed using hot air blowing and/or IR radiation. Hot air blowing is preferred as it has been found that it may be less aggressive towards the substrate material that could yellow or otherwise be damaged by high temperatures after curing of the binder. Said drying step can be performed at a temperature between room temperature and 100° C., for example at 50° C.

Subsequently, the method of the invention can comprise the step applying a primer coating on the upper surface of the substrate, in particular above the adhesion promoter coating. The primer coating can be adapted to make the surface of the substrate adapted to receive an ink. In fact, the substrate is substantially non-porous, and the ink would tend to bleed with a consequent reduction of resolution. Thanks to the primer it is therefore possible to obtain a good fixing of the ink, thereby improving scratch resistance, and a high resolution of the first decorative pattern. In the most preferred embodiment, the primer coating is transparent or translucent so that the second decorative coating is visible through the primer coating itself and the final aspect of the upper surface of the decorative element is formed by a combination of the first and the second aspect.

In the most preferred embodiment, the primer coating can be a radiation curable substance, preferably UV or EB curable substance. Radiation curing is preferred above heat curing because it could be reduced the risk of yellowing or otherwise be damaging the engineered stone. Preferably, the primer coating is acrylate-based. Possible preferred example of the primer coating can comprise acrylate-based oligomers such as epoxy acrylate, polyester acrylate, urethane acrylate. Other examples of acrylate-based primer coating can comprise acrylate-based monomers, preferably having functionality from 1 to 6. Mostly preferably, the primer coating comprises UV absorbers, for example belonging to the triazine family or benzotriazole family. Said UV absorber can reduce the yellowing of the primer coating caused by UV irradiation during normal use of the decorative layer, for example coming from sunlight.

In some embodiments, the primer coating can be applied using a roller coating technique, preferably using soft rollers having a shore hardness below 50 Shore, preferably between 20 and 30 Shore, for example 26 Shore. In some embodiments, the primer coating can be applied in an amount between 5 and 75 g/sqm, more preferably between 5 and 60 g/sqm, for example 6 or 10 g/sqm. Inventors have surprisingly found that with amount of primer coating closer to the lower limit of the indicated range it is possible improve the final surface finish and in particular the glossiness.

After application of the primer coating, the method comprises the step of gelling or at least partially curing the primer coating itself. In the most preferred embodiment, the primer coating is gelled using Gallium UV lamp. Gallium UV lamps is preferred because of the longer wavelength compared to other lamps and can penetrate deeper in the coating.

In the preferred embodiment, the first decorative pattern can be printed on the upper surface of the substrate after the primer coating is applied. The printing step can be performed to obtain a printed pattern with a resolution up to 360 dpi. The printer can be either a single-pass or a multi-pass printer. Printing is preferably an inkjet printing steps that involves jetting of droplets of ink from printing heads, that could be piezo (preferably) or bubble (alternatively) printing head.

It is noted that the printed pattern can be preferably applied in a fixed relationship to a predetermined point, such that the print is applied at a predetermined location of the substrate, e.g. at a fixed distance, that may be zero, from an edge or corner, and that the printed pattern is preferably aligned to an edge, preferably a longitudinal edge of the substrate. Applying the printed pattern in a fixed relation to a predetermined point is advantageous for obtaining at least a partial match between the first and the second decorative pattern.

In the preferred embodiment the method comprises the step of identifying the second pattern present on the substrate and the step of selecting a motif to be printed on the basis of said identification. In this way it is possible to obtain at least a partial match of the first decorative pattern and the second decorative pattern of the decorative element to provide an impression of continuity from the surface to the thickness.

According to the invention, the ink can be preferably a pigment containing ink. The pigment can be organic or inorganic. Inorganic pigments are preferred as they provide a better UV resistance. It is noted that for the black ink the preferred pigment is carbon black. In the most preferred embodiment, the inks are radiation curable ink, preferably UV, EB or Hydro-UV curable ink.

Preferably the inks comprise particles of pigments having a maximum dimension below 2 µm, for example below 1.5 µm, so that it is possible to obtain a printed pattern having a very high resolution. The ink can show a viscosity below 70 cP, preferably below 50 cP and/or a surface tension below 25 dyn/cm.

It is noted that the printed pattern can be obtained by means of multiple color inks, for example with four colors, preferably cyan, magenta, yellow and black, or more colors, for example seven or eight colors. Anyway, in a preferred embodiment the print can be performed with a unique ink, in this case the selected ink is a black ink, this being particularly the case for marble decors.

In some embodiments, the ink can be transparent or translucent so that the second decorative pattern present in the substrate is visible through the ink, i.e. in the same spot where the ink has been dropped the second decorative can be at least partially visible.

The inks are preferably UV curable ink. In particular the ink can comprise a UV curable binder that, once cured, fixes the pigment on the surface of the decorative element. The method preferably comprises the step of at least partially curing or gelling the printed ink. Preferably said step of curing is performed using LED UV lamps.

The method further comprises the step of providing a protective coating above the printed pattern. In the most preferred embodiment, the protective coating is provided in form of a dual layer. Preferably a basecoat is applied immediately on top of the printed pattern and a topcoat is provided above the basecoat.

Preferably the basecoat is transparent or translucent. The basecoat is preferably acrylate based. Possible preferred example of the base coat can comprise acrylate-based oligomers such as epoxy acrylate, polyester acrylate, urethane acrylate. Other examples of acrylate-based base coat can comprise acrylate-based monomers, preferably having functionality from 1 to 6. Preferably the basecoat comprises scratch resistance additives, for example hard particles. Preferably the base coat comprises UV absorbers, for example belonging to the triazine family or benzotriazole family, that can reduce or prevent the yellowing of the primer coating caused by UV irradiation during normal use of the decorative layer, for example coming from sunlight.

The base coat can be preferably applied using roller coating techniques, preferably using soft roller having a shore hardness below 50 Shore, preferably between 20 and 30 Shore, for example 26 Shore. In some embodiments, the basecoat can be applied in an amount between 5 and 75 g/sqm, more preferably between 5 and 60 g/sqm, for example 6 or 50 g/sqm. Inventors have surprisingly found that with amount of base coat closer to the lower limit of the indicated range it is possible improve the final surface finish and in particular the glossiness. On the other hand higher amount of base coat have been found to provide a better synergy with the top coat as it can be more prone to the sanding step as it will be described below.

The method preferably comprises the step of partially, possibly fully, curing the basecoat before the step of providing the topcoat. Preferably the base coat can be cured using Gallium UV lamp and/or Mercury (HG) UV lamp. In the preferred embodiment, the basecoat is fully cured, for example using both Gallium and Mercury (HG) UV lamp.

After the base coat is applied and at least partially, preferably fully, cured, the method can preferably comprise a mechanical surface treatment of the basecoat. Said mechanical surface treatment can be a polishing, lapping or sanding step. In the preferred embodiment, the method comprises a sanding step. This intermediate step between the application of the basecoat and the topcoat can remove any patterns left over from the roller coating such as orange-peel effect and achieve a smooth finish, plus improve the adhesion of the topcoat thereby improving the scratch resistance of the top layer. In the most preferred embodiment, said sanding step is performed using abrasives having a CAMI Grit designation between 300 and 1000 grits. In the most preferred embodiment said sanding step can be performed using multiple abrasives with increasing CAMI Grit designation. For example, a first abrasive can show a CAMI Grit designation between 300 and 400 grits, for example 320 grits. Preferably said first abrasive can move in a direction that is orthogonal, or at least inclined, to an advancing direction of the decorative element. For example, a second abrasive can show a CAMI Grit designation between 400 and 600 grits, for example 500 grits. Preferably said second abrasive can move in a direction that is substantially parallel to the advancing direction of the decorative element. For example, a third abrasive can show a CAMI Grit designation between 500 and 700 grits, for example 600 grits. Preferably said third abrasive can move in a direction that is orthogonal, or at least inclined, to the advancing direction of the decorative element. For example, a fourth abrasive can show a CAMI Grit designation between 600 and 1000 grits, for example 800 grits. Preferably said fourth abrasive can move in a direction that is substantially parallel to the advancing direction of the decorative element. The texture of the basecoat obtained in this sanding step using these kinds of abrasives have been found ideal to optimize the scratch resistance and the glossiness of the final product The topcoat can be transparent or translucent. The topcoat can be preferably acrylate based. Possible preferred example of the top coat can comprise acrylate-based oligomers such as epoxy acrylate, polyester acrylate, urethane acrylate. Other examples of acrylate-based top coat can comprise acrylate-based monomers, preferably having functionality from 1 to 6. Preferably the topcoat comprises UV absorbers, for example belonging to the triazine family or benzotriazole family. Preferably the topcoat further comprises radical scavengers, which can reduce the risk of yellowing the topcoat when exposed to sunlight. The method preferably comprises the step of curing the topcoat, preferably fully curing. During curing of the topcoat, it is possible that one or more of the layers below that are still gelled or partially cured becomes fully cured. The topcoat is preferably cured with Gallium and/or Mercury UV lamp, preferably with both of them.

In some embodiments, when it is desired to obtain a matte finish of the surface it is preferable that the topcoat is cured using excimer radiation.

According to a special embodiment, at least the topcoat is cured using electron beam. Electron beam can be preferable as it does not require the presence of photo initiators in the composition of the topcoat. Therefore, the top layer can be easily certified as suitable for contact with food since there is no release of photo initiators.

According to an alternative preferred embodiment the topcoat comprises polymeric photo initiators. Polymeric photo initiators have the characteristic that they are able to crosslink with the polymeric matrix of the topcoat so that their release is prevented. Therefore, the top layer can be easily certified as suitable for contact with food.

Preferably the topcoat, after curing, shows a polymerization degree of at least 90%, even more preferably 94% or more.

The topcoat can be applied using roller coating, reverse roller coating, curtain coating or spray coating. In a preferred embodiment the topcoat can be applied using roller coat or reverse roller coating, where the latter has been found to provide the best result in term of glossiness. The roller used to apply the topcoat can be a hard roller, for example showing a Shore hardness above 40 Shore, preferably 50 Shore. The use of an hard roller for the application of the uppermost layer provides for a smoother surface finish that can have a higher gloss degree.

In some embodiments, the topcoat can be applied in an amount between 2 and 10 g/sqm, for example 6 g/sqm.

Preferably the topcoat comprises a gloss degree between 20 and 50 measured at 60° angle, more preferably between 25 and 40.

In some embodiments, the method can comprise one or more step for forming a relief on the surface of the decorative element, and/or a one or more step for forming areas with different gloss degree. Said relief and or areas of different gloss degree can be obtained according to a pattern, even more preferably determined by a print. Preferably said print can be obtained via a contactless printing technique like, for example, digital inkjet printing. For example, said print is directed to provide a substance on the surface of the decorative element which modifies chemical or physical features of the surface of the decorative element. Preferably, said substance can be printed in and/or on one or more of the primer coating, base coat or top coat before the respective gelling and/or curing. Said substance can be for example a lacquer repellent which locally displace the material of the coating in and/or on it is printed, so to create an excavation at the pattern. The substance is subsequently removed, for example by drying. Said substance can be a substance that can locally prevent curing, or at least modify the curing condition, of the material of the coating it is printed in and/or on, so that after curing the coating at the pattern will be harder or softer than the coating at the areas where the substance has not been printed. The coating is subsequently treated, for example mechanically to remove uncured or softer areas of the coating to create excavation, possibly together with the substance. Example of this substance can be antioxidants, electron scavenger, curing inhibitors. Alternatively, the substance can cause a local variation of the gloss degree of the coating, for example can locally modify the crystallization conditions of the coating it is printed in and/or on With the intention of better showing the characteristics of the invention, in the following, as an example without any limitative character, several preferred embodiments are described with reference to the accompanying drawings, wherein:

Figure 1:
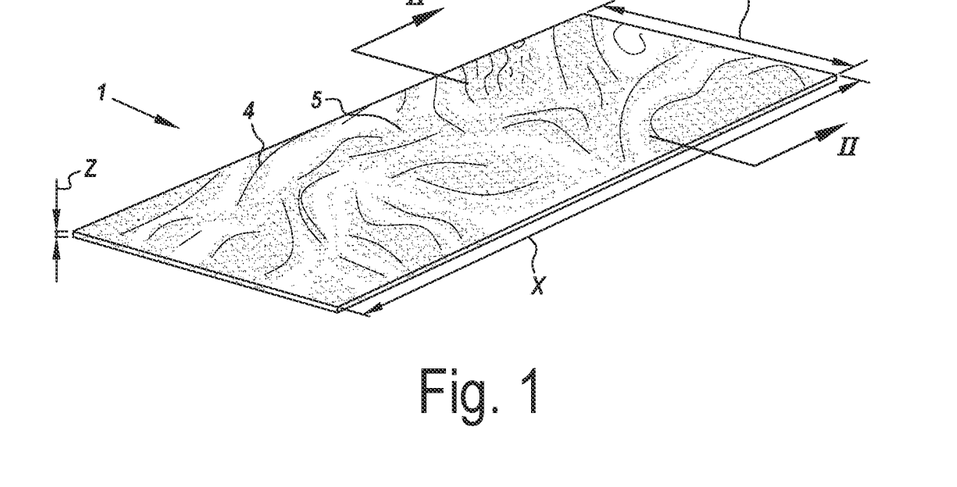
FIG. 1 is a perspective view of a decorative element in accordance with the invention.
Figure 2:
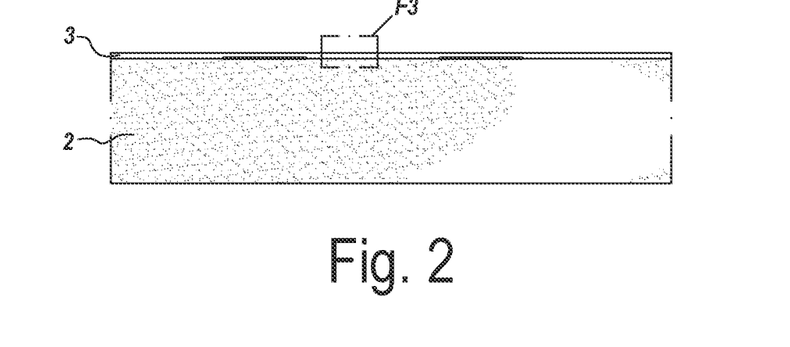
FIG. 2 on a larger scale shows the cross section along the line II-II indicated in FIG. 1.

Referring to FIGS. 1 and 2 it is shown a decorative element 1 is in form of a slab and has a length X of at least 2 m, preferably at least 2.5 m, for example 3 m or more, and a width Y of at least 1 m preferably 1.5 m or more.

Moreover, the decorative element 1 shows a thickness Z of at least 10 mm, preferably at least 20 mm for example 30 mm.

The decorative element 1 comprises a substrate 2 and a top layer 3 covering the upper surface of the substrate 2.

The substrate 2 is made of an engineered stone, wherein the engineered stone comprises an inorganic filler and a cured organic binder that bonds together the particles of inorganic filler. The inorganic filler is based on silicon oxide like silica or feldspar. The binder is preferably a thermosetting resin and more in particular an unsaturated polyester resin.

The decorative element 1 comprises a first decorative pattern 4 and a second decorative pattern 5. Said first and second decorative patterns 4, 5 are both visible from the top surface of the decorative element itself. The upper surface of the decorative element shows a glossy degree between 20 and 50 measured at 60° angle, more preferably between 25 and 40.

The first decorative pattern 4 is a printed pattern that is present in the top layer 3, whereas the second decorative pattern is a three-dimensional decoration that is present in the entire thickness of the substrate 2. The first decorative pattern 4 has a higher resolution than that of the second decorative pattern 5.

Figure 3:
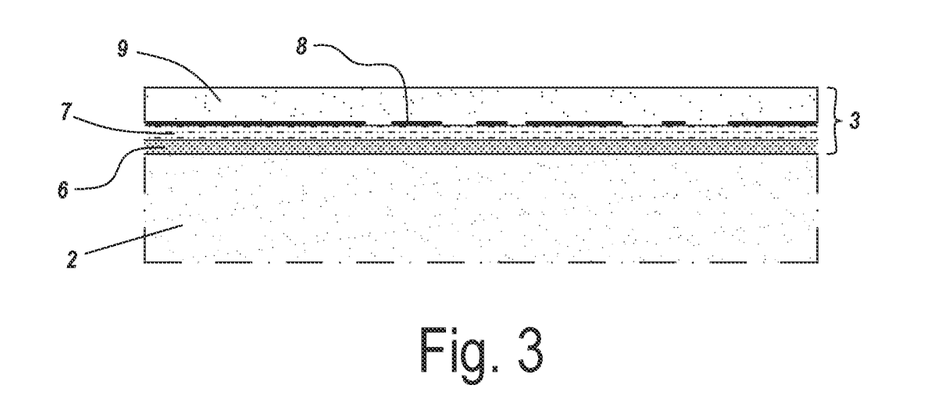
FIG. 3 on a larger scale shows a view on the area F3 indicated on FIG. 2.

As shown in FIG. 3, the top layer comprises, from bottom to top: an adhesion promoting coating 6, a primer coating 7, a decorative layer 8 a protective coating 9.

The adhesion promoting coating 6 comprises a silane-based adhesion promoter. The adhesion promoting coating 6 is transparent.

The primer coating 7 is acrylate based and comprises a UV cured substance. The primer coating 7 is transparent.

The decorative layer 8 is formed by inkjet printed inks form forming the first decorative pattern 4. Said inks forming the decorative layer comprise a UV cured binder and inorganic pigments.

The protective coating 9 is acrylate based and comprises a UV cured substance. The protective coating 9 is transparent.

Figure 4:
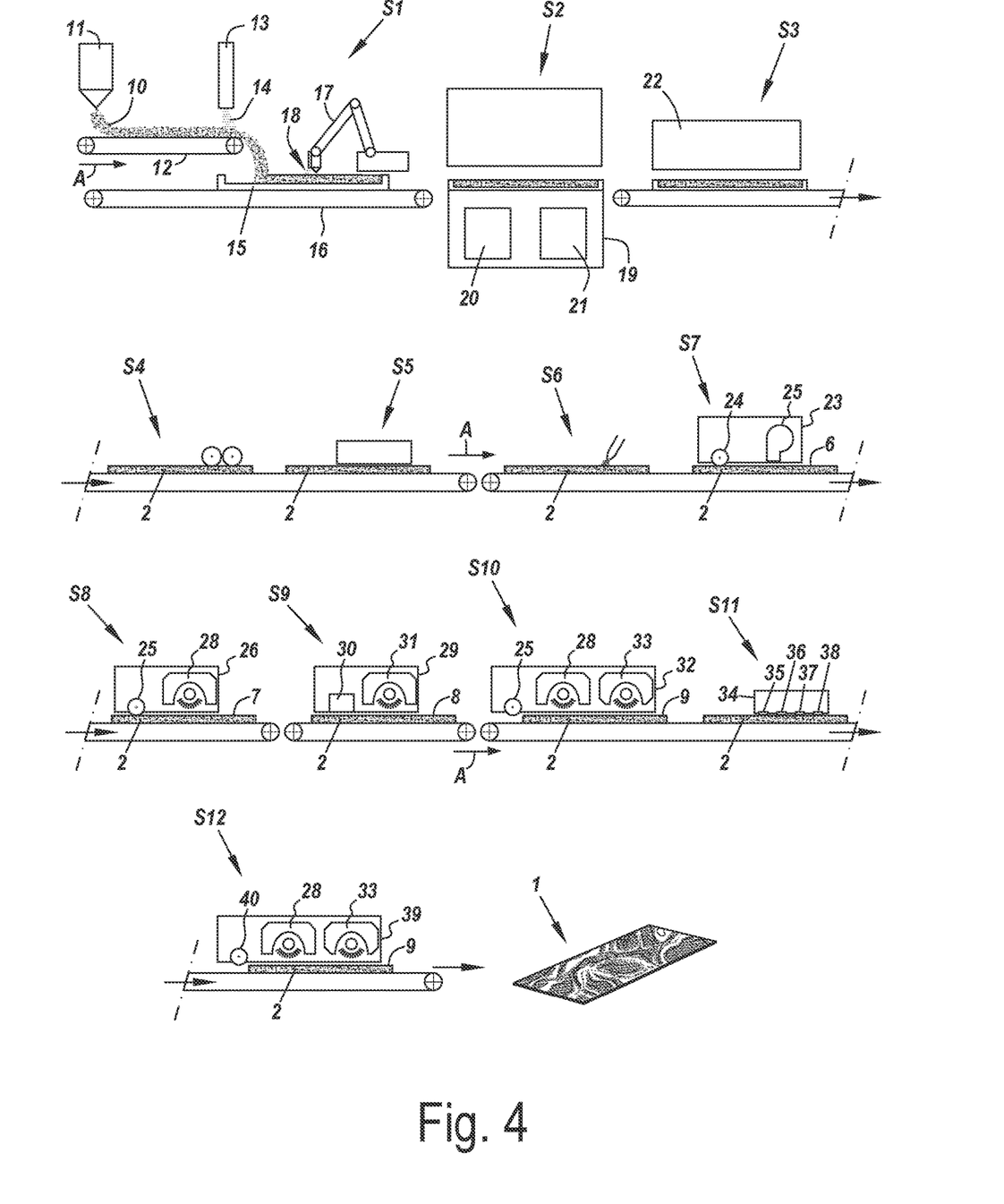
FIG. 4 shows some steps in a method for manufacturing the decorative element of FIG. 1.

FIG. 4 shows some steps in a method, according to the invention, for manufacturing the decorative element of FIG. 1.

In a step S1 a mixture 10 is provided into a mold 15 for manufacturing substrate 2. The mixture 10 comprises the inorganic filler and the binder.

The filler is composed by a combination of powder and grains, for example said combination comprises at least 60 wt % of grains and/or granules and between 20 to 35 wt % of powder form wherein, for example, the granules have a particles size distribution between 0.1 and 6.5 mm and the powder have an average particle dimension lower than 45 µm, preferably lower than 20 µm. The filler is preferably at least the 80% by weight of the mixture, preferably more than the 85% and more preferably more than 90%.

The binder is in powder form and form up to 10% by weight of the mixture.

The mixture 10 further comprises additives, like for example coupling agent, catalyst or crosslinkers.

In step S1 the mixture 10 is deposited from a hopper 11 on a first belt 12. A feeder 13 feed a first set of coloring agents 14 to the mixture 10 on the first belt 12. By virtue of the advancing of the first belt 12, the mixture 10 with the first coloring agents 14 falls into a mold 15 disposed on a second belt 16 placed below the first belt 12. As a consequence of this fall, the first coloring agent 14 is randomly distributed into the mixture 10 in the mold 15.

Once the mixture 10 is in the mold 15, a robotic arm 17 delivers a second set of coloring agents 18 into the mixture 10 according to a predetermined motif. The motif obtained by the combination of the first set of coloring agents 14 and the second set of coloring agents 18 substantially form the second decorative pattern 5.

The mixture 10 in the mold 15 advances in an advancing direction A to a compacting station 19 for a compaction step S2. Said compacting station 19 comprises a vibrating unit 20 and a vacuum unit 21, for the application of vibration and vacuum on the mixture in the mold 15 that leads to the compaction thereof.

The mixture 10, yet in the molding, is then carried to a curing station 22 where the binder is cured in a curing step S3. The cure of the binder is activated at a temperature below 200° C. and then continues as an exothermic reaction.

After curing step S3, the obtained substrate 2 of engineered stone, which is now a coherent material having a porosity below 0.2%, is then extracted from the mold 15 and carried to multiple mechanical machining station for finishing operations on the substrate 2.

In a step S4 the substrate 2 is calibrated to flatten at least the upper surface thereof. Subsequently in a step S5 the substrate 2 is rectified so that it finally reaches the desired final dimension. It is noted that steps S4 and S5 can be inverted.

Subsequently, at least the upper surface of the substrate is mechanically treated in a polishing step S6. The polishing step S6 is conducted using abrasives having a CAMI Grit designation between 300 and 600 grits, preferably 400 grits.

The substrate 2 is then moved to a first coating station 23 for the application of the adhesion promoter coating 6 in a first coating step S7. The first coating station 23 comprises one or more coating rollers 24 and a hot air blower 25 for the drying of the adhesion promoter coating. The adhesion promoter coating is preferably applied in an amount of 40 g/sqm and in water-based solution or suspension. The drying is carried out at 50° C.

The substrate 2 is then moved to a second coating station 26 for the application of the primer coating 7 in a second coating step S8. The second coating station 26 comprises one or more coating rollers 27 and one or more Gallium UV Lamps 28 for the gelling of the primer coating 7. The primer coating 7 is preferably applied in an amount of 6 g/sqm using soft rollers 25, having a hardness of 26 Shore. After application the primer coating 7 is gelled using the Gallium UV Lamps 28.

The substrate 2 is then moved to a printing station 29 for printing the first decorative pattern 4 to form the decorative layer 8 in a printing step S9. The printing station comprises a single pass inkjet printer 30 and UV LEDs 31. The printer 30 is configured to print at least 4 inks, cyan, magenta, yellow and black, with the possible addition of one or more spot colors. The inks are UV curable pigmented ink. The pigments are an inorganic ink. After printing the inks are gelled using the UV LEDs 31.

The substrate 2 is then moved to a third coating station 32 for the application of a basecoat forming the protective coat 9 in a third coating step S10. The third coating station 32 comprises one or more coating rollers 27, one or more Gallium UV Lamps 28 and one or more Mercury HG UV lamps 33 for the curing of the basecoat. The basecoat is applied in an amount of 50 g/sqm using soft rollers 25, having a hardness of 26 Shore. After application the basecoat is fully cured using the Gallium UV Lamps 28 and the Mercury HG UV lamps 33.

After fully curing of the basecoat, the substrate 2 is then moved to a sanding station 34 for performing a sanding step S11. In the example, the sanding station 34 is configured to sand the surface of the basecoat using multiple abrasives 35, 36, 37 and 38. A first abrasive 35 has a CAMI Grit designation of 320 grits and moves in a direction that is orthogonal to the advancing direction A. A second abrasive 36 has a CAMI Grit designation of 500 grits and moves in a direction that is substantially parallel to the advancing direction A. A third abrasive 37 shows a CAMI Grit designation of 600 grits and moves in a direction that is orthogonal to the advancing direction A. A fourth abrasive 38 shows a CAMI Grit designation between of 800 grits and moves in a direction that is substantially parallel to the advancing direction A.

The substrate 2 is then moved to a fourth coating station 39 for the application of a topcoat forming the protective coat 9 in a fourth coating step S12. The fourth coating station 39 comprises one or more coating rollers 40, one or more Gallium UV Lamps 28 and one or more Mercury HG UV lamps 33 for the curing of the topcoat. The topcoat is applied in an amount of 6 g/sqm using hard rollers 40, having a hardness of 50 Shore. After application, the topcoat is fully cured using the Gallium UV Lamps 28 and the Mercury HG UV lamps 33.

The present invention is in no way limited to the hereinabove described embodiments, but such decorative element and method for manufacturing thereof be realized according to different variants without leaving the scope of the present invention.

Further, as is clear from the content of the description, the present invention relates to one or more of the items as listed below, numbered from 1 to 84:

Item 1. A method for manufacturing a decorative element comprising a substrate and a top layer wherein the substrate is made of an engineered stone and wherein the top layer comprises a decorative pattern, comprising the steps of:
  providing a mixture comprising at least an inorganic filler and a binder;
  compacting the mixture;
  curing the binder to obtain the substrate;
and wherein the method comprises the step of inkjet printing a first decorative pattern on at least a top surface of the substrate.

Item 2. The method according to item 1, wherein the decorative element is in form of a board or slab.

Item 3. The method according to item 2, wherein the slab has a length of at least 2 m, preferably at least 2.5 m, for example 3 m or more, and a width of at least 1 m preferably 1.5 m or more.

Item 4. The method according to item 2 or 3, wherein the slab shows a thickness of at least 10 mm, preferably at least 20 mm for example 30 mm.

Item 5. The method according to any of the preceding items, wherein the inorganic filler comprises mineral material like any kind of stone, sands, siliceous mineral material, for example quartz, silica sand, clay, feldspar cristobalite granite, talc or calcareous mineral material, for example, calcium carbonate, marble, gypsum.

Item 6. The method according to any of the preceding items, wherein the inorganic filler can comprise ceramic, glass, metals and other inorganic material, for example recycled materials.

Item 7. The method according to any of the preceding items, wherein the filler is composed for its majority, i.e. at least 50% weight, and more preferably mainly consist, of an inorganic material that is based on silicon (Si).

Item 8. The method according to any of the preceding items, wherein the filler can be in form of powder, granules, shards, grains, aggregates or any other particulate form although granules and powder forms are preferred.

Item 9. The method according to any of the preceding items, wherein the filler is at least partially in powder form having an average particle dimension lower than 45 μm, preferably lower than 20 μm.

Item 10. The method according to any of the preceding items, wherein the filler is at least partially in form of aggregates, grains and/or granules having a particles size distribution between 0.1 and 6.5 mm, preferably between 0.1 and 2 mm, 0.1 and 0.7 mm.

Item 11. The method according to any of the preceding items, wherein the filler is composed by a combination of powder and grains, for example said combination can comprises at least 60 wt % of grains and/or granules and between 20 to 35 wt % of powder form wherein, for example, the granules have a particles size distribution between 0.1 and 6.5 mm and the powder have an average particle dimension lower than 45 μm, preferably lower than 20 μm.

Item 12. The method according to any of the preceding items, wherein the filler is preferably at least the 80% by weight of the mixture, preferably more than the 85% and more preferably more than 90%.

Item 13. The method according to any of the preceding items, wherein the binder is a curable substance that is configured to be cured thereby bonding together the particles of the filler.

Item 14. The method according to any of the preceding items, wherein the binder comprises, preferably substantially consists of, polyester resin preferably unsaturated polyester resin.

Item 15. The method according to any of the preceding items, wherein binder is preferably less than the 20% by weight of the mixture, preferably less than the 15% and more preferably less than 10%.

Item 16. The method according to any of the preceding items, wherein the mixture comprises additives, like for example coupling agents, catalyst or reagents to activate or speed up hardening of the binder, and/or temporary bonding agent like glues or thermoplastic resins that temporarily bonds the stone or stone like material.

Item 17. The method according to any of the preceding items, wherein the mixture comprises at least a silane based coupling agent.

Item 18. The method according to any of the preceding items, wherein the mixture comprises one or more coloring agent.

Item 19. The method according to item 18, wherein the coloring agent can be in the form of dye or pigment.

Item 20. The method according to item 19, wherein pigments can be organic or inorganic, the latter are even more preferred as the UV resistance is further improved.

Item 21. The method according to any preceding items, wherein the mixture is provided into a mold.

Item 23. The method according to item 21, wherein before and/or during the step of providing the mixture into the mold a first coloring agent or a first set of coloring agents is added to the mixture.

Item 24. The method according to item 22, wherein the first coloring agent, or first set of coloring agents, is uniformly distributed in the substrate to provide basic color of the engineered stone and/or wherein the first coloring agent, or first set of coloring agents, is distributed according to a random motif, like a random veined effect or a dotted effect.

Item 25. The method according to any item from 21 to 23, wherein during and/or after the step of providing the mixture into the mold a second coloring agent or second set of coloring agents can be added in such a manner to form a second decorative pattern of the decorative element.

Item 26. The method according to item 24, wherein the second coloring agent or second set of coloring agent is provided according to a predetermined motif e.g. a veined effect imitating the veins or flakes of a marble, a granite or any natural stone.

Item 27. The method according to item 25, wherein the random motif of the first coloring agent, or first set of coloring agents, or the predetermined motif of the second coloring agent, or second set of coloring agents, or preferably a combination thereof forms a second decorative pattern of the decorative element.

Item 28. The method according to item 26, wherein the second decorative pattern is present in the substrate and in particular is present through the entire thickness of the substrate.

Item 29. The method according to any of the preceding items, wherein the method comprises the step of compacting the mixture.

Item 30. The method according to item 28, wherein the compacting step is conducted by applying both vacuum and vibration.

Item 31. The method according to any of the preceding items, wherein the cure of the binder can be obtained by means of radiation, heat, chemical curing or other suitable techniques.

Item 32. The method according to any of the preceding items, wherein the cure of the binder is conducted at a temperature below 500° C., for example below 200° C., for example at room temperature.

Item 33. The method according to any of the preceding items, wherein the curing step is thermally activated and continues in an exothermic reaction.

Item 34. The method according to item 32, wherein the activation of the curing of the binder can occur at a temperature below 100° C.

Item 35. The method according any of the preceding items, wherein after curing the engineered stone comprises a porosity below 1% volume, preferably below 0.5%, even more preferably below 0.2%.

Item 36. The method according to any of the preceding items, wherein after curing the method comprises a calibration step and/or a squaring step.

Item 37. The method according to any of the preceding items, wherein method comprises a polishing step adapted to provide the desired texture to the upper surface of the substrate.

Item 38. The method according to item 36, wherein said polishing step is conducted using abrasive having a CAMI Grit designation between 300 and 600 grit, preferably 400 grit.

Item 39. The method according to any of the preceding items, wherein it comprises the step of applying an adhesion promoter coating on the upper surface of the substrate.

Item 40. The method according to item 38, wherein the adhesion promoter coating comprises a silane-based substance.

Item 41. The method according to item 38 or 39, wherein the adhesion promoter coating is applied in a wet quantity between 20 and 60 g/sqm, preferably 40 g/sqm.

Item 42. The method according to any of items from 38 or 340, wherein the adhesion promoter coating is a water-based substance, and the method further comprises the step of drying the adhesion promoter coating.

Item 43. The method according to item 41, wherein the adhesion promoter coating, before drying, comprises a dry to water content between 1:6 and 1:2, for example 1:4.

Item 44. The method according to item 41 or 42, wherein said drying step can be performed using air blowing and/or IR radiation.

Item 45. The method according to any of the preceding items, wherein the method comprises applying a primer coating on the upper surface of the substrate.

Item 46. The method according to item 44, wherein the primer coating is transparent or translucent.

Item 47. The method according to item 44 or 45, wherein the primer coating is a radiation curable substance, preferably UV curable substance.

Item 48. The method according to any of items from 44 to 46, wherein the primer coating is acrylate based, for example acrylate-based oligomers such as epoxy acrylate, polyester acrylate, urethane acrylate, or acrylate-based monomers, preferably having functionality from 1 to 6.

Item 49. The method according to any of items from 44 to 47, wherein the primer coating comprises UV absorbers, for example belonging to the triazine family or benzotriazole family.

Item 50. The method according to any of items from 44 or 48, wherein the method comprises the step of gelling the primer coating, preferably using Gallium (Ga) UV lamp.

Item 51. The method according to any of the preceding items, wherein the printing step is performed to obtain a printed pattern with a resolution up to 360 dpi.

Item 52. The method according to any of the preceding items, wherein the printed pattern is preferably applied in a fixed relationship to a predetermined point.

Item 53. The method according to any of the preceding items, wherein the method comprises the step of identifying the second pattern present on the substrate and the step of selecting a motif to be printed on the basis of said identification.

Item 54. The method according to any of the preceding items, wherein the ink is a pigment containing ink.

Item 55. The method according to item 53, wherein the pigment can be organic or inorganic.

Item 56. The method according to any of the preceding items, wherein for the black ink the preferred pigment is carbon black.

Item 57. The method according to any of the preceding items, wherein the inks are UV curable ink.

Item 58. The method according to item 56, wherein the method preferably comprises the step of curing the printed ink, preferably using LED UV lamps.

Item 59. The method according to any of the preceding items, wherein the ink is transparent or translucent so that the second decorative pattern present in the substrate is visible through the ink.

Item 60. The method according to any of the preceding items, wherein the method comprises the step of providing a protective coating above the printed pattern.

Item 61. The method according to item 59, wherein the protective coating comprises a base coat that is applied immediately on top of the printed pattern and a top coat that is provided above the base coat.

Item 62. The method according to item 60, wherein the base coat is transparent or translucent.

Item 63. The method according to item 60 or 61, wherein the base coat is preferably acrylate based, for example acrylate-based oligomers such as epoxy acrylate, polyester acrylate, urethane acrylate, or acrylate-based monomers, preferably having functionality from 1 to 6.

Item 64. The method according to any of item from 60 to 62, wherein the base coat comprises scratch resistance additives, for example hard particles.

Item 65. The method according to any of item from 60 to 63, wherein the base coat comprises UV absorbers, for example belonging to the triazine family or benzotriazole family.

Item 66. The method according to any of item from 60 to 64, wherein the base coat is applied in an amount between 5 and 75 g/sqm, preferably between 5 to 60 g/sqm, for example 6 or 60 g/sqm.

Item 67. The method according to any of item from 60 to 65, wherein the method comprises the step of at least partially, possibly fully, curing the basecoat before the step of providing the top coat.

Item 68. The method according to any of item from 60 to 66, wherein the base coat is cured using Gallium UV lamp.

Item 69. The method according to item 66 or 67, wherein after the base coat is applied and at least partially cured, preferably fully cured, the method comprises the step of sanding the base coat.

Item 70. The method according to any of items from 60 to 68, wherein the top coat is transparent or translucent.

Item 71. The method according to any of items from 60 to 69, wherein the top coat is preferably acrylate based, for example acrylate-based oligomers such as epoxy acrylate, polyester acrylate, urethane acrylate, or acrylate-based monomers, preferably having functionality from 1 to 6.

Item 72. The method according to any of items from 60 to 70, wherein the top coat comprises UV absorbers, for example belonging to the triazine family or benzotriazole family.

Item 73. The method according to any of items from 60 to 71, wherein the top coat comprises radical scavengers.

Item 74. The method according to any of item from 60 to 72, wherein the top coat is applied in an amount between 2 and 10 g/sqm, for example 6 g/sqm.

Item 75. The method according to any of items from 60 to 73, wherein the method comprises the step of at least partially, preferably fully, curing the top coat.

Item 76. The method according to item 74, wherein during curing of the top coat the base coat is finally cured.

Item 77. The method according to item 74 or 75, wherein the top coat is cured with Gallium and/or Mercury UV lamp, preferably with both of them.

Item 78. The method according to any of items from 74 to 75, wherein the top coat is cured using excimer radiation.

Item 79. The method according to any of items from 74 to 75, wherein the top coat is cured using electron beam.

Item 80. The method according to any of items from 74 to 77, wherein the top coat comprises polymeric photo initiators.

Item 81. The method according to any of items from 74 to 79, wherein the top coat, after curing, shows a polymerization degree of at least 90%, even more preferably 94% or more.

Item 82. The method according to any of items from 60 to 80, wherein the base coat and the top coat can be applied using roller coating, reverse roller coating, curtain coating or spray coating.

Item 83. The method according to item 81, wherein the base coat is applied using roller coating whereas the top coat is applied using reverse roller coating.

Item 84. The method according to any of the preceding items, comprises one or more step for forming a relief on the surface of the decorative element, and/or a one or more step for forming areas with different gloss degree.

Item 85. The method according to item 83, wherein said relief and/or areas of different gloss degree can be obtained according to a pattern, even more preferably determined by a print.

What is claimed is:

1. A method for manufacturing a decorative element comprising a substrate and a top layer wherein the substrate is made of an engineered stone and wherein the top layer comprises a decorative pattern, comprising the steps of:
providing a mixture comprising at least an inorganic filler and a binder;
compacting the mixture; and
curing the binder to obtain the substrate;
wherein the method comprises the step of inkjet printing a first decorative pattern on at least a top surface of the substrate; and
wherein the method comprises the step of providing a protective coating above the printed pattern, wherein the protective coating comprises a base coat that is applied immediately on top of the printed pattern and a top-coat that is provided above the base coat, between the application of the base coat and the application of the top coat the method comprises the step of sanding the base coat.

2. The method according to claim 1, wherein the filler is composed for its majority, i.e. at least 50% weight of an inorganic material that is based on silicon (Si).

3. The method according to claim 1, wherein the binder comprises polyester resin.

4. The method according to claim 1, wherein the binder is less than the 15% by weight of the mixture.

5. The method according to claim 1, wherein the mixture is provided into a mold.

6. The method according to claim 5, wherein before and/or during the step of providing the mixture into the mold a first coloring agent or a first set of coloring agents is added to the mixture.

7. The method according to claim 6, wherein the first coloring agent, or first set of coloring agents, is uniformly distributed in the substrate to provide basic color of the engineered stone and/or wherein the first coloring agent, or first set of coloring agents, is distributed according to a random motif, like a random veined effect or a dotted effect.

8. The method according to claim 5, wherein during and/or after the step of providing the mixture into the mold a second coloring agent or second set of coloring agents can be added in such a manner to form a second decorative pattern of the decorative element.

9. The method according to claim 8, wherein the second coloring agent or second set of coloring agents is provided according to a predetermined motif.

10. The method according to claim 7, wherein the random motif of the first coloring agent, or first set of coloring agents, forms a second decorative pattern of the decorative element.

11. The method according to claim 9, wherein the predetermined motif of the second coloring agent, or second set of coloring agents, forms a second decorative pattern of the decorative element.

12. The method according to claim 11, wherein the second decorative pattern is present in the substrate and in particular is present through the entire thickness of the substrate.

13. The method according to claim 1, wherein after the curing step the method comprises a polishing step adapted to provide the desired texture to the upper surface of the substrate.

14. The method according to claim 13, wherein said polishing step is conducted using abrasive having a Coated Abrasives Manufacturers' Institute (CAMI) Grit designation between 300 and 600 grit.

15. The method according to claim 1, wherein it comprises the step of applying an adhesion promoter coating on the upper surface of the substrate.

16. The method according to claim 15, wherein the adhesion promoter coating comprises a silane-based substance.

17. The method according to claim 1, wherein the method comprises applying a primer coating above the upper surface of the substrate.

18. The method according to claim 17, wherein the primer coating is transparent or translucent.

19. The method according to claim 11, wherein the method comprises the step of identifying the second pattern present on the substrate and the step of selecting a motif to be printed on the basis of said identification.

\* \* \* \* \*